Oct. 15, 1963   R. A. ROBERT ETAL   3,106,863
CASING FOR TRANSPORTING ROCKET-BOMBS FROM AN AIRCRAFT
Filed March 29, 1960

INVENTORS
ROGER AIME ROBERT
PIERRE PAUL MATGE 3,106,863
CASING FOR TRANSPORTING ROCKET-BOMBS
FROM AN AIRCRAFT
Roger Aimé Robert, Le Vesinet, and Pierre Paul Matge, Cachan, France; Louise Rosemonde Paulette Jacquot, heir of said Pierre Paul Matge, deceased
Filed Mar. 29, 1960, Ser. No. 18,387
Claims priority, application France Apr. 2, 1959
4 Claims. (Cl. 89—1.7)

This invention relates to casings or streamlined bodies of the type used for transporting a plurality of rocket-bombs suspended from an aircraft.

It has already been proposed to construct streamlined casings of this character with a front portion or point made from breakable material so that the body will remain integral as long as no rocket-bombs have been released or fired, the first rocket-bomb fired by the control device breaking this point and uncovering the firing orifices of the rocket tubes.

In the case of high-speed aircraft, the sudden destruction of the casing point may prove detrimental, as far as flying conditions are concerned, and thus become the cause of difficulties or complications for the pilot, just at a time when all his intellectual faculties are required for controlling the aircraft and firing the rockets and/or other weapons.

It is an object of this invention to provide a casing provided with a breakable point and adapted to carry a plurality of rocket-bombs forming a bundle of parallel rockets, the casing being so constructed as to avoid the inconvenience set forth hereinabove.

It is another object of this invention to provide a casing of this character which is at the same time simple and economical to manufacture.

According to this invention, the breakable point of the casing is so constructed that when a rocket-bomb is released or fired it will break not the whole of the point-forming member but only that portion thereof which registers with the associated rocket-bomb.

Thus, when the first rocket-bomb is fired only a relatively small fraction of the cross-sectional or front area of the point will have an opening formed therein, the surface of this fraction corresponding substantially to that of the fired rocket-bomb. Then, the firing of another rocket-bomb will form an opening having substantially the same area, and so forth. Thus, aerodynamic conditions are modified but only gradually, this being particularly advantageous regarding aircraft handling and performance. Moreover, in case the firing were to be stopped after the release of only one or a few rocket-bombs, the aircraft characteristics will be maintained at a level close to that obtaining before the nose of the rocket-bomb casing is broken.

In the preferred case of a releasable casing, the time during which the perforated point produces a relatively important drag is very short for the casing is released immediately after the last rocket-bomb has been fired.

This invention is also concerned with a typical form of a rocket-bomb casing having a breakable point which is characterized in that said point comprises means for connecting the same to the remaining portion of the casing, advantageously to the tubes or tube portions provided in the casing for holding and guiding the rocket-bombs, so that the breakable point will constitute a kind of wall formed with cylindrical cells or recesses fitting over the tube end portions and imparting to the assembly a strength sufficient to prevent breakage of one wall portion, as a consequence of the firing of a single rocket-bomb, from interfering with the wall portions adjacent that aligned with the associated rocket-bomb.

This invention further relates to an improved method of manufacturing a point of the type set forth hereinabove, which is characterized by the field or shop formation of a foam material from a coating casting or lining, the thicknesses of this material being selected with a view to position properly the more fragile areas where the breakage is to take place under the conditions set forth herein.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which.

Figure 1:
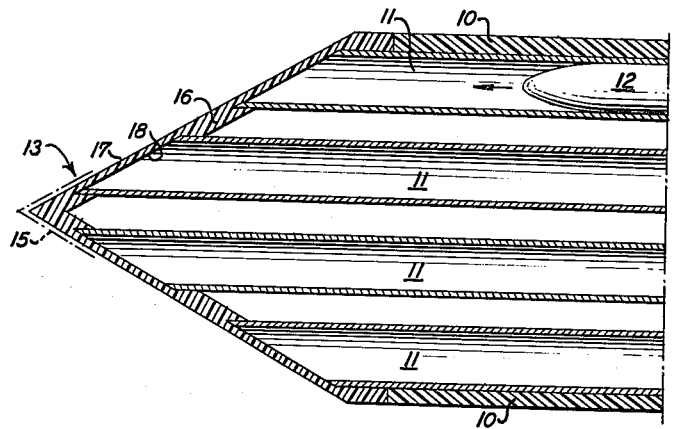
FIGURE 1 is a longitudinal diagrammatic section.
Figure 2:
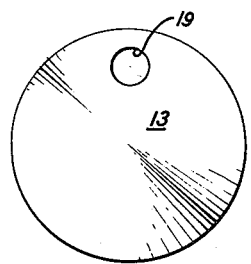
FIGURE 2 is a diagrammatic front view showing the device after a first rocket-bomb has been fired.

The rocket-firing support comprises, in addition to an outer tubular body 10, a number of rocket-guiding tubes or tubular portions 11 disposed longitudinally in the body 10 and each adapted to receive a rocket-bomb 12.

According to the present invention the front wall or point 13 of the casing is constructed by applying or casting a material, for example, of the type adapted to yield a polyurethane foam so as to fill the gaps between the tubes 11 and form a front wall 13 for example by using an outer mold as suggested diagrammatically by the chain-dotted line 15. After the material has set to constitute a solid foam (by using means already known per se) the point thus obtained comprises relatively thick portions 16 filling the gaps between and fast with the tubes due to the method of manufacture, these portions 16 being thicker than the circular portions 17 closing the bevelled orifices 18 registering with the tubes.

As long as none of the rocket-bombs housed in the casing 10 is fired, the point 13 remains unaltered. When a rocket-bomb such as, for example, the one shown in FIG. 1, is fired, only the disk-shaped portion of the front wall which registers with the tube $11_1$ containing this rocket-bomb will be broken, not by the rocket-bomb itself but by the pressure wave preceding it, thus forming an orifice 19 of relatively small cross-sectional area, the other portions of the point remaining unaltered so that aerodynamic conditions are modified only to a very small extent. When another rocket-bomb is fired, another hole is formed in the point, and so forth.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What we claim is:

1. Apparatus comprising a bundle of rocket tubes aligned parallel and adapted to guide and discharge rockets loaded therein, and a front cover on said bundle, said tubes defining spaces therebetween, said cover including protrusions integral therewith extending into said spaces and between said tubes at the forward end of the latter, said protrusions connecting the cover and bundle to form an integral unit, said cover being of a material adapted to withstand aerodynamic forces whereby to protect the rockets in the tubes and being further adapted to limited destruction immediately adjacent each tube upon discharge of a rocket therethrough so that the discharge of each rocket has only a limited effect on the aerodynamic characteristics of said cover and therefore said bundle.

2. Apparatus as claimed in claim 1 wherein said front cover is of plastic.

3. Apparatus as claimed in claim 1 wherein said front cover is of a foamed plastic.

4. Apparatus as claimed in claim 1 wherein said front cover is of polyurethane foam.

References Cited in the file of this patent

UNITED STATES PATENTS

| 2,844,073 | Re et al. | July 22, 1958 |
| 2,944,695 | Yusz | July 12, 1960 |

FOREIGN PATENTS

| 924,013 | France | Mar. 3, 1947 |
| 1,017,950 | Germany | Oct. 17, 1957 |
| 578,034 | Canada | June 23, 1959 |